United States Patent
Barba et al.

(10) Patent No.: US 7,174,250 B2
(45) Date of Patent: Feb. 6, 2007

(54) METHOD FOR DETERMINING AN EXHAUST GAS RECIRCULATION QUANTITY FOR AN INTERNAL COMBUSTION ENGINE PROVIDED WITH EXHAUST GAS RECIRCULATION

(75) Inventors: Christian Barba, Fellbach (DE); Martin Dietz, Stuttgart (DE); Guenter Moll, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/527,741

(22) PCT Filed: Aug. 26, 2003

(86) PCT No.: PCT/EP03/09414

§ 371 (c)(1),
(2), (4) Date: Oct. 21, 2005

(87) PCT Pub. No.: WO2004/033880

PCT Pub. Date: Apr. 22, 2004

(65) Prior Publication Data

US 2006/0167613 A1    Jul. 27, 2006

(30) Foreign Application Priority Data

Sep. 12, 2002   (DE) ................ 102 42 234

(51) Int. Cl.
*F02M 25/07*   (2006.01)
*F02B 47/08*   (2006.01)
*F02D 35/00*   (2006.01)
*G06F 19/00*   (2006.01)

(52) U.S. Cl. ............. 701/108; 123/568.21; 123/568.22

(58) Field of Classification Search ........... 123/568.11, 123/568.16, 568.21, 568.22; 701/101–103, 701/108, 115; 73/117.3, 118.1
See application file for complete search history.

(56) References Cited

U.S. PATENT DOCUMENTS

| 6,009,862 | A | 1/2000 | Wanat | |
|---|---|---|---|---|
| 6,067,800 | A | 5/2000 | Kolmanovsky et al. | |
| 6,530,361 | B1* | 3/2003 | Shiraishi et al. | 123/435 |
| 6,715,287 | B1 | 4/2004 | Engel et al. | |
| 6,879,904 | B2* | 4/2005 | Muto et al. | 701/108 |
| 6,952,640 | B2* | 10/2005 | Bleile et al. | 701/108 |
| 2002/0179060 | A1* | 12/2002 | Engel et al. | 701/108 |
| 2006/0005819 | A1* | 1/2006 | Barba et al. | 123/568.21 |

FOREIGN PATENT DOCUMENTS

| DE | 199 34 508 A1 | 7/1999 |
|---|---|---|
| DE | 199 53 358 A1 | 12/1999 |
| DE | 101 35 954 A1 | 7/2001 |
| EP | 1 221 544 A2 | 7/2002 |

* cited by examiner

*Primary Examiner*—Willis R. Wolfe, Jr.
(74) *Attorney, Agent, or Firm*—Crowell & Moring LLP (57) ABSTRACT

In a method of determining the quantity of exhaust gas recirculation for an internal combustion engine having exhaust gas recirculation, the exhaust gas recirculation quantity ($r_{AGR}$, $m_{AGR}$) is determined from an exhaust gas temperature ($T_{exhaust}$), a fresh gas temperature ($T_{air2}$), a fresh gas quantity ($m_{air}$) and/or a volumetric efficiency ($\eta$). The fresh gas temperature ($T_{air2}$) is determined by a fresh gas temperature model (15) which is adaptively adjusted in response to influencing parameters relevant to the fresh gas temperature.

9 Claims, 6 Drawing Sheets

METHOD FOR DETERMINING AN EXHAUST GAS RECIRCULATION QUANTITY FOR AN INTERNAL COMBUSTION ENGINE PROVIDED WITH EXHAUST GAS RECIRCULATION

BACKGROUND AND SUMMARY OF THE INVENTION

This application claims the priority of German patent document 102 42 234.6, filed Sep. 12, 2002 (PCT International Application No. PCT/EP2003/009414, filed Aug. 26, 2003), the disclosure of which is expressly incorporated by reference herein.

This invention relates to a method for determining an exhaust gas recirculation quantity for an internal combustion engine, such as is used as a drive motor for motor a vehicle, for example.

Exhaust gas recirculation is known to offer advantages with regard to fuel consumption and exhaust emissions. The term "quantity" is used for the sake of simplicity, to denote a physical variable indicative of quantity (e.g., the mass or the quantity rate or mass flow rate) of recirculated exhaust gas and/or gas mixture fed into the internal combustion engine.

The quantity of fresh gas fed into the combustion chamber(s) of an internal combustion engine may be measured, for example, via a hot-film mass flow meter (HFM) in a respective intake manifold and/or intake path. The exhaust gas recirculation quantity cannot be determined in this way, however, and is therefore conventionally determined (and known) indirectly for at most a very specific design state, e.g., a normal state of an internal combustion engine without any additional measures. For other engine operating states, and in particular for changing temperatures and changing atmospheric pressure of the environment from which the fresh gas and/or fresh air for the motor is obtained, it is useful to establish a modified exhaust gas recirculation rate in comparison with the design state (i.e., the normal state), in order to be able to comply accurately with emission limits, for example. Therefore there is a need to know exactly the exhaust gas recirculation rate at all points in time in order to be able to regulate it at a suitable level.

German Patent Document DE 199 34 508 A1 describes a method for controlling exhaust gas recirculation, wherein a setpoint exhaust gas recirculation rate is determined on the basis of the engine load, engine torque and air pressure; an actual exhaust gas recirculation rate and the opening and closing movements of a throttle valve are detected by sensors, and an exhaust gas recirculation control valve is operated as a function of the difference between the actual and setpoint exhaust gas recirculation rates as well as a throttle valve opening signal, a throttle valve closing signal and the respective air pressure. The exhaust gas recirculation quantity is determined by sensors based on a measurement of the pressure difference at a throttle opening provided in a respective exhaust gas recirculation line.

U.S. Pat. No. 6,067,800 discloses the determination of the exhaust gas recirculation quantity using an estimate of the fresh gas temperature as a function of influencing parameters.

A method for determining the exhaust gas recirculation quantity is known from generic European Patent 1 221 544 A2, in which the exhaust gas recirculation quantity is determined from an exhaust gas temperature, a fresh gas temperature, a fresh gas quantity, and/or a volumetric efficiency, and the fresh gas temperature is determined by means of a fresh gas temperature model that is adaptively adapted to influencing parameters relevant to the fresh gas temperature.

One object of the present invention is to provide a method of the type defined in the preamble, which permits precise and reliable determination of the exhaust gas recirculation quantity with little effort, in particular at various operating states.

This and other objects and advantages are achieved by the method according to the invention, in which the exhaust gas recirculation quantity is determined from an exhaust gas temperature, a fresh gas temperature, a fresh gas quantity and/or a volumetric efficiency. The fresh gas temperature is determined by a fresh gas temperature model which is adaptively adjusted while the engine is running, adapting it to relevant influencing parameters pertaining to the fresh gas temperature. Volumetric efficiency is a measure of the fresh gaseous supply to the engine. It is defined as the ratio of the total quantity of gas supplied to the engine per operating cycle to the theoretical load, that is, the ratio of the filling per operating cycle to the theoretical fresh load in filling the geometric cubic capacity of the engine with air and/or mixture in the ambient state, when the engine is not supercharged and/or in the state downstream from a compressor and/or a charge air cooler that is provided in an internal combustion engine with supercharging. For operation with exhaust gas recirculation, volumetric efficiency is defined as the ratio of the total quantity of gas mixture supplied per operating cycle to the quantity of gas mixture in filling the geometric cubic capacity of the internal combustion engine with gas mixture in the state after admixture through the exhaust gas recirculation. Volumetric efficiency is also referred to as absorption capacity.

The exhaust gas temperature, a temperature of the recirculated exhaust gas (also known as the exhaust gas recirculation temperature), and the volumetric efficiency are preferably also determined by corresponding models, which are adaptable to relevant influencing parameters pertaining to the respective quantities. Preferably, each of the models comprises a basic model, a correction model and/or a filter block. With the basic model, a basic value is determined for the output variable and/or for a part of the output variable of the corresponding overall model. This basic value is corrected, if necessary, by an output variable of the correction model if certain input variables that are relevant for the output variable of the overall model deviate from predefined reference values and/or reference states. When speaking of a correction model, this in fact refers to a group of correction models having one correction model per input variable. For the determination of deviations, the input variables are monitored, preferably by measurement and subsequent comparison with the reference values. The basic models and/or correction models are preferably engine characteristic maps and/or characteristic lines, but they may also be linear and/or nonlinear mathematical and/or physical simulation models based on differential equations. The basic models and/or correction models may also be neural networks.

Each of the overall models preferably also has a filter block. The filter blocks are preferably first-order delay elements, so-called PT1 elements. However, other filters, preferably dynamic filters, may also be used, such as delay elements of a higher order or delay elements in combination with monostable elements. By means of filtering, a dynamic response is imposed upon an input variable of a filter block, so that a (calculated) output variable of the filter block approximates the real response of the measured equivalent of the output variable. Such filtered variables, i.e., variables determined by filtering, can be adjusted and/or regulated more easily by a regulating and/or controlling means. This is the case with the exhaust gas recirculation rate in particular. It is regulated more rapidly and has less overshooting, which leads to a lower component burden and to more steady emissions, thus preventing emission peaks. Filtering of variables is also known as dynamic correction.

The method according to the invention can be integrated to advantage into a control unit, such as an engine control unit and/or a vehicle control unit which is conventionally present in a motor vehicle, for example. With the method according to the invention, the prevailing exhaust gas recirculation quantity (i.e., exhaust gas recirculation rate) can be calculated with a high precision under steady-state and non-steady-state conditions and under different operating conditions and ambient conditions.

The basic models and correction models are preferably determined in experiments or on a test stand, for example, before market introduction of the internal combustion engine, and are stored in a memory of a control unit of the conventional type. The basic models and correction models are preferably only type-specific, and are not determined in advance for each individual internal combustion engine in this way and then adapted to the individual engine during operation thereof.

The method according to the invention for determining the exhaust gas recirculation quantity does not require any sensors for measuring the exhaust gas recirculation quantity. Even without exhaust gas recirculation quantity sensors, the quantity of recirculated exhaust gas can be determined accurately and reliably. To do so, the models used are adapted by using certain correction models, so the method is automatically adapted to changes occurring during the service life of the engine; such changes would include operating states that deviate from a basic state (e.g., non-steady-state processes, changes in ambient conditions).

Other objects, advantages and novel features of the present invention will become apparent from the following detailed description of the invention when considered in conjunction with the accompanying drawings.

DETAILED DESCRIPTION OF THE DRAWINGS

The same reference notation is used here to denote the same functional components and/or quantities. For the sake of simplicity, certain input variables of certain function blocks such as summing points, filter blocks, models are identified with u. Likewise, certain output variables of certain function blocks are indicated with y. The input variables and output variables have the reference notation of the corresponding function blocks as a subscript. If the input variables are reference values and/or reference states, also referred to as initial values and/or initial states, then these input variables have the numeral 0 as an additional subscript. If an input variable and/or an output variable stands for a group of input variables and/or output variables, respectively, then this input variable and/or output variable has the letter i as an additional subscript. The input variables and/or output variables may of course also be state variables and/or states. If a function block is depicted as a rectangle having multiple rectangles staggered one behind the other, this is a depiction of a model comprising multiple individual models.

Figure 1:
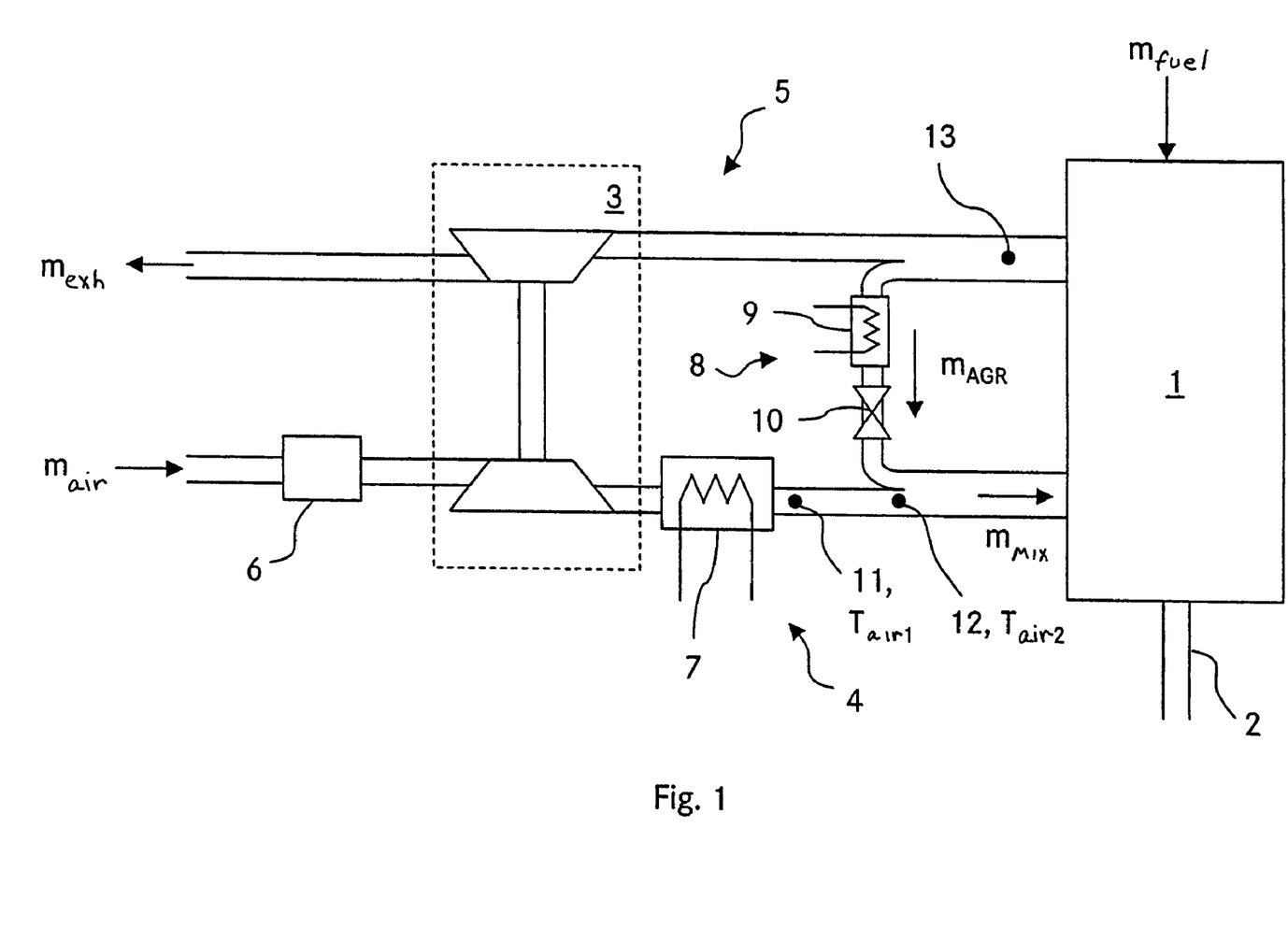
FIG. 1 shows a schematic diagram of an internal combustion engine having an intake path and an exhaust path.

FIG. 1 is an example a system in which the inventive method may be used for determining an exhaust gas recirculation rate. An intake pipe and/or an intake path 4 for fresh gas and/or fresh air and an exhaust path 5 are assigned to the internal combustion engine 1 having a driveshaft 2. A turbocharger 3 is provided in the intake path 4 and in the exhaust path 5; a compressor of the exhaust gas turbocharger 3 is situated in the intake path 4 and an exhaust turbine of the turbocharger 3 is situated in the exhaust path 5. An exhaust gas recirculation system 8 is provided between the internal combustion engine 1 and the exhaust gas turbocharger 3, connecting the exhaust gas path 5 to the intake path 4. Downstream from the turbocharger 3 and upstream from the connecting point (not indicated further) to the recirculation system 8, a charging air cooler 7 is preferably provided in the intake path 4. It is used for cooling the fresh air. Another cooler 9 and an exhaust gas recirculation valve 10 are preferably provided in the recirculation system 8, with the exhaust gas recirculation valve preferably being situated downstream from the charging air cooler 9.

A quantity of fuel $m_{fuel}$ is supplied to the internal combustion engine through a feed line. In addition, a quantity of fresh gas mair is supplied to the internal combustion engine 1 through the intake path 4. This quantity of fresh gas $m_{air}$ is measured by a sensor 6, e.g., a hot-film air-mass sensor (HFM). An exhaust gas quantity $m_{exhaust}$ is preferably sent through the exhaust path 5 into an exhaust system of the type conventionally provided. The quantity of fresh gas is mixed with a quantity of exhaust recirculated through the recirculation system 8 at a measurement point (not indicated further here) and is supplied as the gas mixture quantity $m_{mix}$ to the internal combustion engine 1.

The temperature $T_{air1}$ and the pressure of the fresh gas are preferably determined (by appropriate sensors and meters) at a measurement point 11 in the intake path 4 which is preferably situated downstream from the charging air cooler 7 and upstream from the connecting point to the recirculation system 8. In addition, variables that are also relevant for the inventive process include i) a fresh gas temperature $T_{air2}$ at a point in the intake path 4 directly upstream from the mixing point, (i.e., at a point 12), ii) for example, an exhaust temperature which corresponds to the temperature of the exhaust after leaving the internal combustion engine at a point 13 in the exhaust path 5 and iii) a temperature of the recirculated exhaust which corresponds to the temperature of the recirculated exhaust preferably directly prior to admixture in the exhaust path 4. The method for determining the exhaust temperature and the temperature $T_{Air2}$ is explained in greater detail below.

Figure 2:
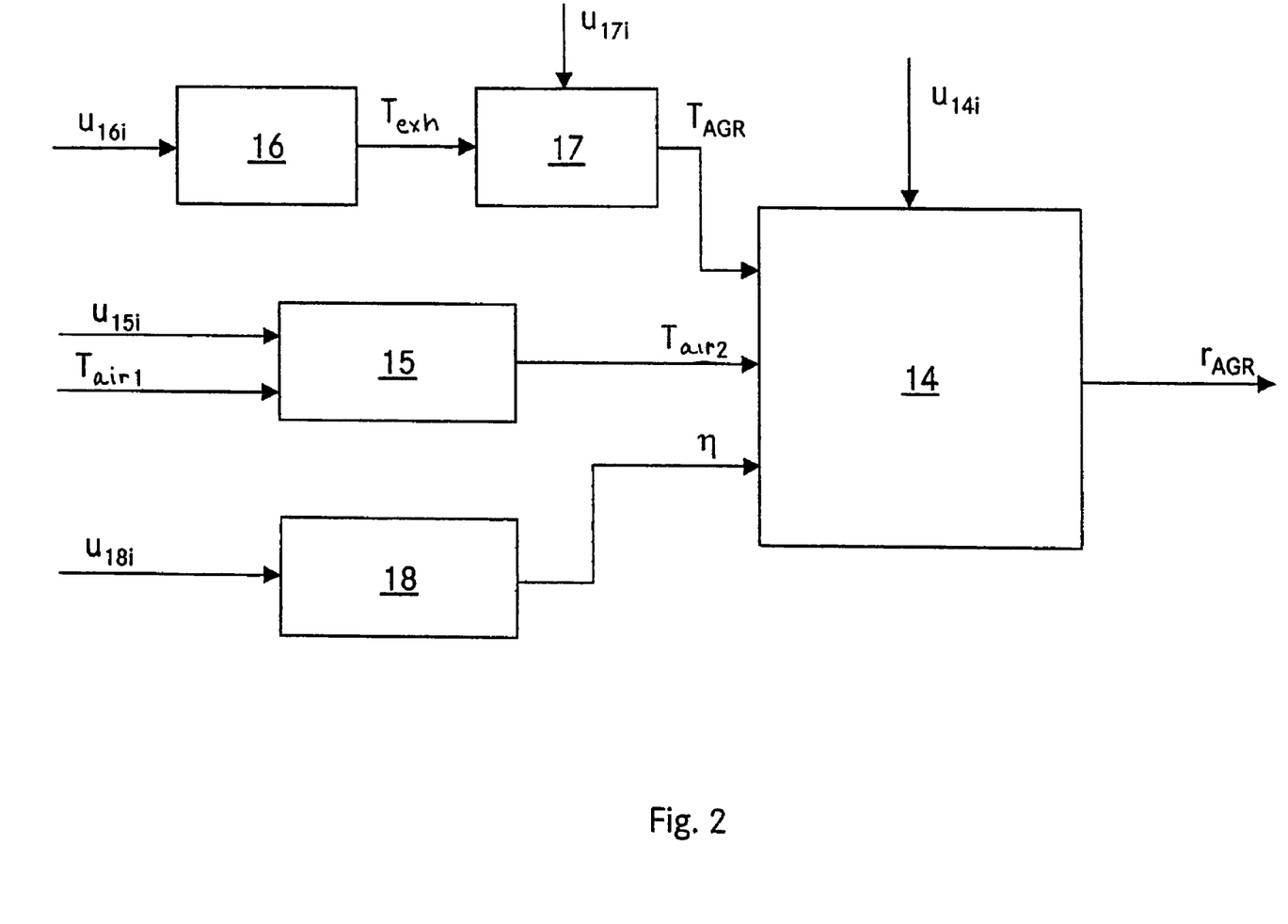
FIG. 2 is a block diagram that illustrates the method according to the invention, for determining the exhaust recirculation rate.

FIG. 2 shows a block diagram of the inventive method for determining an exhaust gas recirculation quantity and/or an exhaust gas recirculation rate $r_{AGR}$. In a function block 14, an exhaust gas recirculation quantity and/or an exhaust gas recirculation rate $r_{AGR}$ is determined from a temperature of a recirculated exhaust gas $T_{AGR}$, hereinafter also referred to as as the exhaust gas recirculation temperature, a fresh gas temperature and/or a charging air temperature $T_{air2}$ directly before admixture of the added exhaust gas, a volumetric efficiency η and other input variables $u_{14i}$ that are relevant in particular to the exhaust gas quantity and/or rate, in particular the fresh air quantity $m_{air}$ determined via the sensor 6. This is done by using a mass balance equation, a volumetric efficiency equation which is based on the ideal gas equation, and a mixing equation based on an energy balance equation. In addition, a mixed temperature can be determined from these variables and equations after admixture of the recirculated exhaust gas in the intake path 4 and the total cylinder mass and/or gas mixture quantity $m_{mix}$ drawn in by the internal combustion engine. The exhaust gas recirculation quantity $m_{AGR}$ is determined by subtracting the fresh gas component $m_{air}$ from the total gas mixture quantity $m_{mix}$.

The fresh gas temperature directly before admixture of the recirculated exhaust gas $T_{air2}$ is calculated by means of a fresh gas temperature model 15, based on the fresh gas temperature $T_{air1}$ at the measurement point 11 (see FIG. 1) and additional input variables $u_{15i}$ which are relevant for the fresh gas temperature. The exhaust gas recirculation temperature $T_{AGR}$ is determined by means of an exhaust gas recirculation model 17 from input variables $u_{17i}$ which are relevant to the exhaust gas recirculation temperature and from the exhaust gas temperature $T_{Exhaust}$, these in turn being determined by means of an exhaust gas temperature model 16 from input variables $u_{16i}$ that are relevant to the exhaust gas temperature. The volumetric efficiency η is determined by means of a volumetric efficiency model 18 from input variables $u_{18i}$ which are relevant to the volumetric efficiency. The models 15 through 18 are illustrated in detail in FIGS. 3–6.

Figure 3:
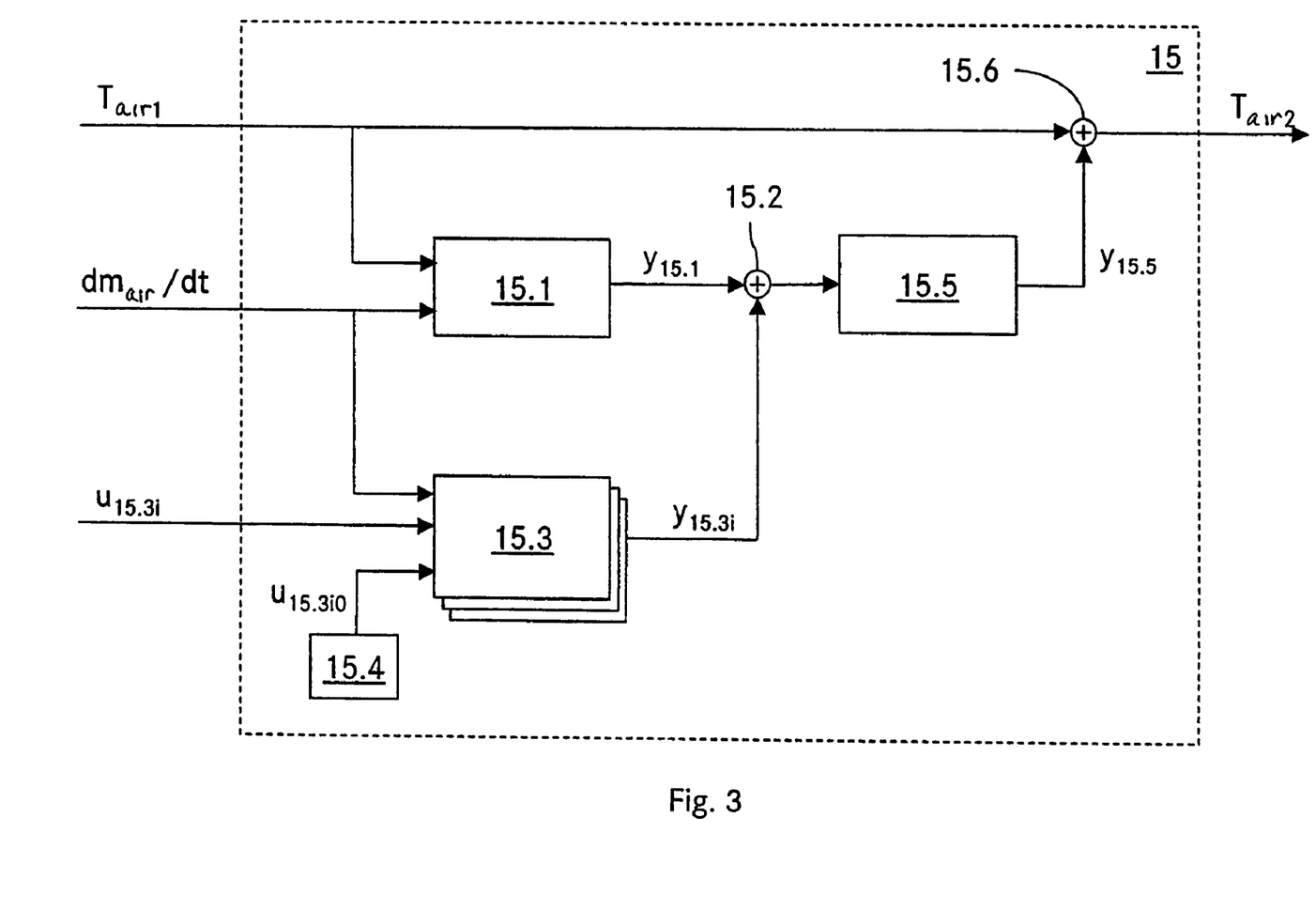
FIG. 3 is a block diagram of an overall model for determining a fresh gas temperature.

FIG. 3 shows a block diagram of the overall model for determining the fresh gas temperature $T_{air2}$ and/or the fresh gas temperature model 15. A fresh gas temperature $T_{air2}$ directly before admixture of the recirculated exhaust gas is determined from the fresh gas temperature $T_{air1}$ at the measurement point 11 in FIG. 1, the fresh gas mass flow $d_{mair}/dt$ and additional input variables $u_{15.3i}$ that are relevant for the fresh gas temperature. The input variables $u_{15.3i}$ of the function block 15 of FIG. 2 comprise the fresh gas mass flow $d_{mair}/dt$ and the input variables $U_{15.3i}$. The model 15 describes heating or cooling of the fresh air intake and/or the fresh gas intake from the temperature $T_{air1}$ at the measurement point 11 up to a measurement point 12 directly prior to admixture of the recirculated exhaust gas in the intake path 4. On the basis of the temperatures of various components, in particular the temperature of the internal combustion engine, there may be a significant heating, or in certain cases also a cooling effect, which must be taken into account in determining the exhaust gas recirculation rate. The mass fraction of the fresh air and/or the fresh gas relative to the total quantity of gas mixture is large in comparison with the recirculated exhaust gas, so an accurate knowledge of the temperature of the fresh gas immediately before admixture of the recirculated exhaust gas is desirable. An inaccurate temperature of the fresh gas would greatly distort the exhaust gas recirculation rate calculated in the function block 14 in FIG. 2. The fresh gas temperature model 15 thus describes the phenomenology of a heating process and/or a cooling process.

A basic temperature change $y_{15.1}$ relative to a reference state and/or an initial state is determined from the fresh gas temperature $T_{air1}$ and the fresh gas mass flow $d_{mair}/dt$, using a basic model 15.1 in the form of an engine characteristic map. In a correction model 15.3, a correction variable $y_{15.3i}$ for the change in the basic temperature $y_{15.3i}$ is determined from the fresh gas mass flow $d_{mair}/dt$ and additional input variables $u_{15.3i}$. The deviation in the input variables $u_{15.3i}$ from these respective predefined reference input variables and/or reference states $u_{15.3i0}$ is taken into account here. This deviation is preferably defined as the difference between the input variables $u_{15.3i}$ and the reference input variables $u_{15.3i0}$ assigned to them. However, the deviation may also be defined as the quotient of the input variables $u_{15.3i}$ and the reference input variables $u_{15.3i0}$. The reference input variables $u_{15.3i0}$ may be entered into a field 15.4, which is preferably a memory area of a control unit.

The input variables $u_{15.3i}$ and the reference states $u_{15.3i0}$ assigned to them preferably include a cooling water temperature of the internal combustion engine and/or an ambient temperature. The correction model 15.3 preferably involves a group of models for each input variable $u_{15.3i}$. Likewise, the correction value $y_{15.3i}$ is a vector and/or a group of correction values, namely a correction value $y_{15.3i}$ for each input variable $u_{15.3i}$.

At a combining point 15.2, the correction value(s) $y_{15.3i}$ is (are) added to the basic temperature $y_{15.i}$. (A multiplication may also be performed instead of a summation at the combining point 15.2.) A corrected temperature change forms the output of the coupling point 15.2 and is sent to a filter 15.5, which is preferably a first-order delay element. A dynamic output variable (filtered and corrected temperature change) $y_{15.5}$ is formed from the static input variable by means of the filter 15.5. Thus there is a dynamic correction. Due to the filtering, the change in temperature preferably has a more fluid and thus more realistic course. At a coupling point 15.6, the filtered and corrected temperature change $y_{15.5}$ is added to the fresh gas temperature $T_{air1}$ to form the fresh gas temperature immediately before admixture of the recirculated exhaust gas $T_{air2}$. Instead of a summation, a multiplication may also be performed at the coupling point 15.6.

Figure 4:
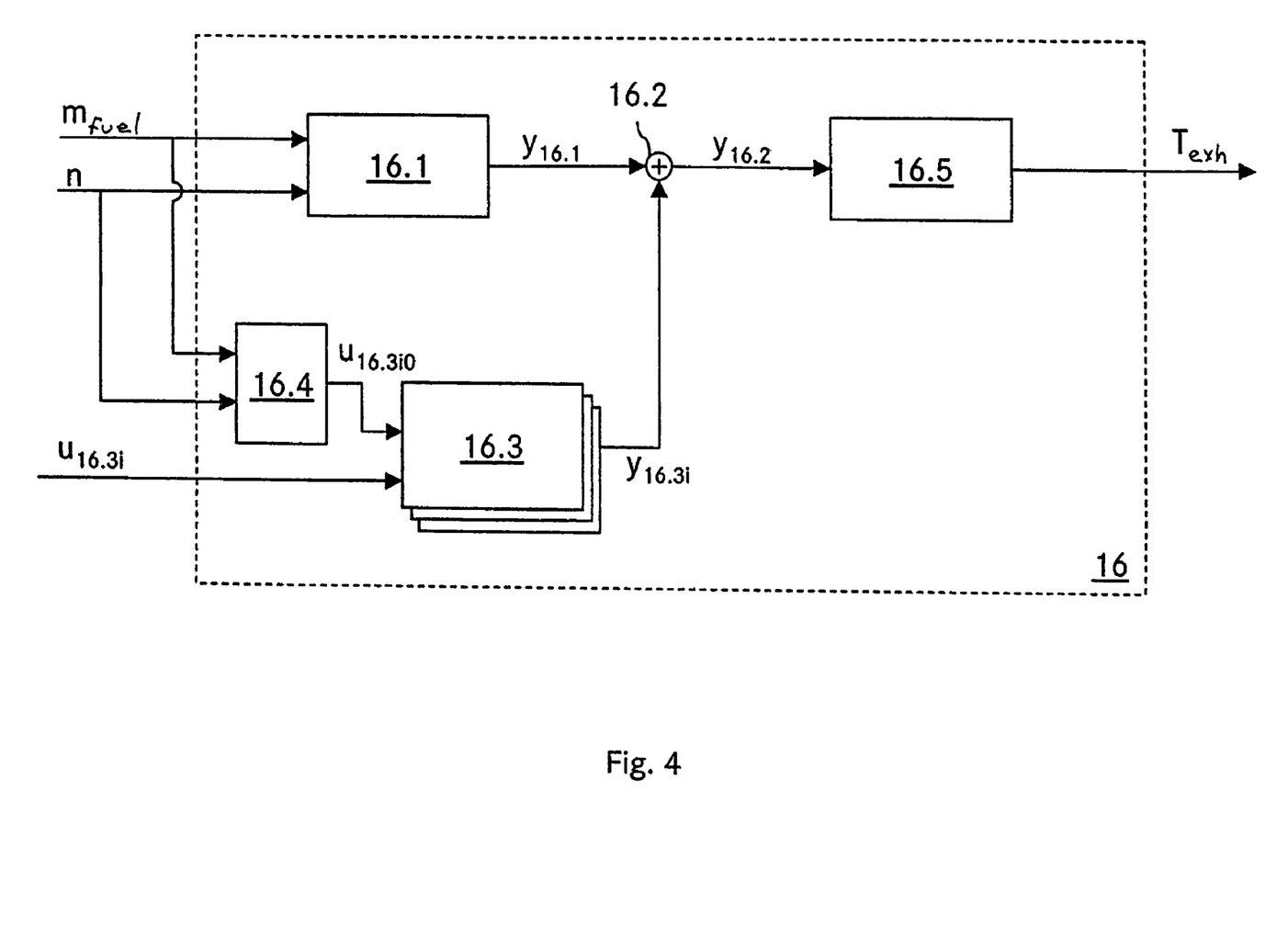
FIG. 4 is a block diagram of an overall model for determining an exhaust gas temperature.

FIG. 4 shows a block diagram of the overall exhaust gas temperature model 16 for determining the exhaust gas temperature $T_{exhaust}$, based on a fuel quantity $m_{fuel}$, a rotational speed n of the internal combustion engine and from additional input variables $u_{16.3i}$ that are relevant to the exhaust gas temperature $T_{exhaust}$. In a basic model 16.1, a basic temperature $y_{16.1}$, preferably static, is determined from the fuel quantity $m_{fuel}$ and the rotational speed n. The input variables $u_{16.i}$ of the function block 16 in FIG. 2 comprise the input variables $u_{16.3i}$, the rotational speed n and the fuel quantity $m_{fuel}$. Then a correction value $y_{16.3i}$ for the preferably static exhaust gas temperature $y_{16.1}$ is determined from the input variables $u_{16.3i}$ in a correction model 16.3. To do so, any deviation of the input variables $u16.3i$ from predefined reference input variables and/or initial input variables $u_{16.3i0}$ assigned to them is taken into account in the correction model. This deviation is preferably defined as the difference between the input variables $u_{16.3i}$ and the reference input variables $u_{16.3i0}$; however, it may also be defined as the quotient of these input variables. The reference input variables $u_{16.3i0}$ are determined in a basic reference variable engine characteristic map 16.4 to which the rotational speed n and the fuel quantity $m_{fuel}$ are preferably supplied as input variables.

The input variables $u_{16.3i}$ preferably include a cooling water temperature of the internal combustion engine, a pressure and/or a charge pressure in the intake path 4 (e.g., at the measurement point 11 in FIG. 1), a trigger start of injection (optionally a post-injection or an exhaust gas) back pressure, which varies greatly (especially when using a particulate filter in the exhaust gas path 5), a so-called rail pressure, a temperature of the gas mixture in the intake path after admixture of the recirculated exhaust gas and before entrance into the internal combustion engine and/or a mixed temperature from a previous computation step of the method according to the invention (preferably the last computation step), and the exhaust gas recirculation rate from a previous computation step of the method according to the invention (preferably the last computation step). The rail pressure is understood to be the pressure which prevails in diesel engines with a common rail device on the common fuel supply line for the individual cylinders of the internal combustion engine. Except for the mixed temperature and the exhaust gas recirculation rate, the other input variables $u_{16.3i}$ are preferably in the form of measured values.

The method according to the invention takes place continuously. In other words, during operation of the internal combustion engine, the actual value for the exhaust gas recirculation rate is determined anew by repeated iteration of the inventive method, and is thus updated. The mixed temperature (calculated in block 14 in FIG. 2) and the exhaust gas recirculation rate (preferably that determined in the last computation step and/or the last iteration of the inventive method) form the input variables $u_{16.3i}$ of the correction model 16.3.

The correction model 16.3 includes a corresponding model (preferably an engine characteristic map) for each input variable $u_{16.3i}$. Likewise a correction variable $y_{16.3i}$ is determined for each input variable $u_{16.3i}$ by means of the correction model 16.3, which consists of a group of models. The correction variable $y_{16.3i}$ is thus a group and/or a vector of correction variables which are added to the preferably static basic exhaust gas temperature $y_{16.1}$ at the combining point 16.2, forming a corrected exhaust gas temperature $y_{16.2}$, preferably a static temperature. Instead of a summation, a multiplication may also be performed at the coupling point 16.2, if this is advantageous. Thus a correction of the preferably static exhaust gas temperature value $y_{16.1}$ takes place at the combining point 16.2 when the current operating state, as defined by the input variables $u_{16.3i}$, deviates from a reference state, as defined by the reference input variables $u_{16.3i0}$.

The corrected, preferably static exhaust gas temperature $y_{16.2}$ is filtered (via a dynamic correction) in the function block 16.5, forming a current dynamic exhaust gas temperature $T_{exhaust}$. Since there is usually a heat exchange of exhaust gas with an exhaust gas bend which is typically provided in a motor vehicle, the actual exhaust gas temperature differs from a statically determined exhaust gas temperature $y_{16.2}$. By filtering in the function block 16.5, the calculated exhaust gas temperature can be approximated to the actual exhaust gas temperature.

Figure 5:
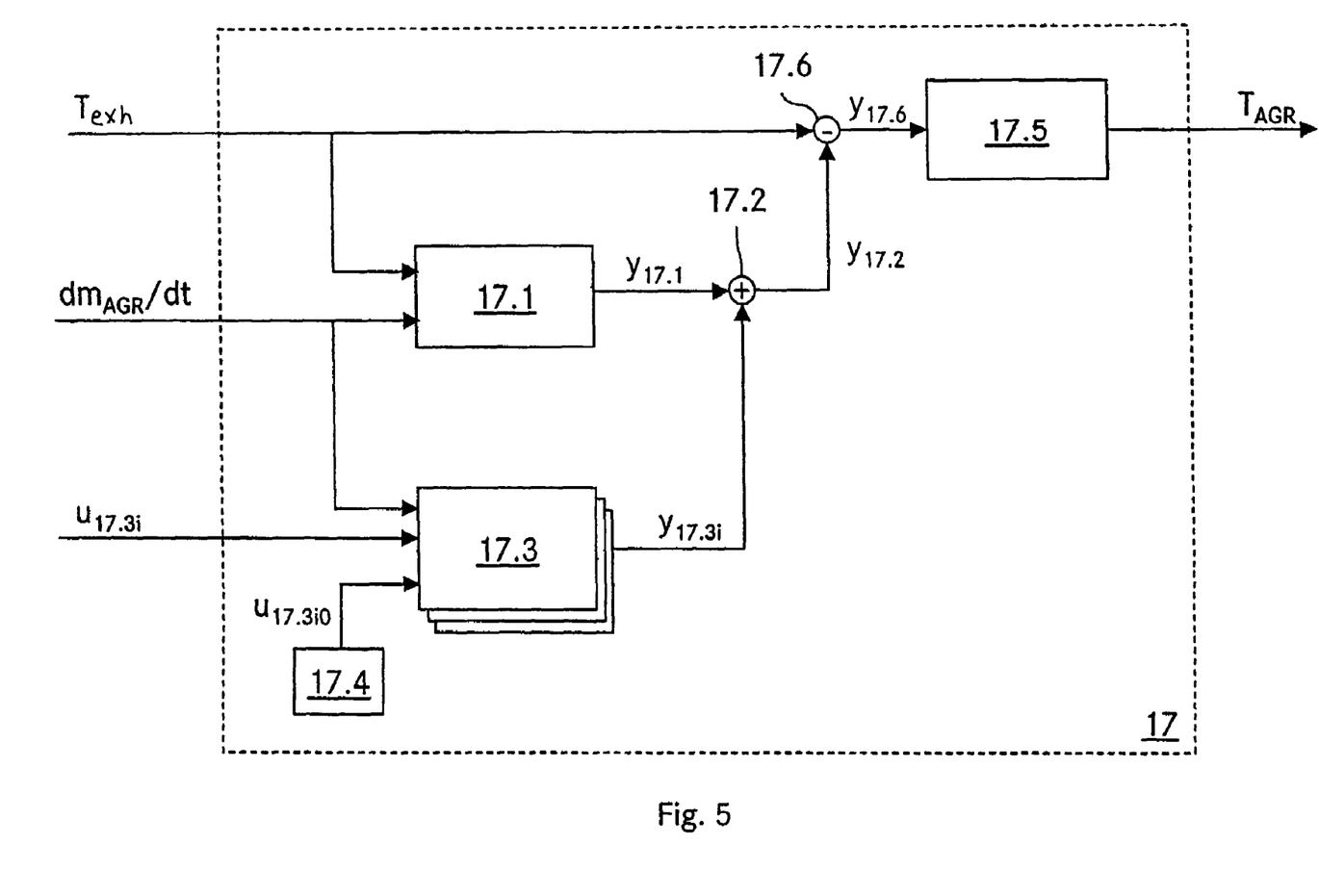
FIG. 5 is a block diagram of an overall model for determining a temperature of the recirculated exhaust gas.

FIG. 5 shows as a block diagram an overall model 17 (also referred to as the exhaust gas recirculation model) for determining the temperature of the recirculated exhaust gas. The model corresponds in structure to the fresh gas temperature model 15. With the exhaust gas recirculation model 17, the temperature of the recirculated exhaust gas $T_{AGR}$ is determined from an exhaust gas temperature $T_{exhaust}$ which represents the output variable of the function block 16 (explained in greater detail with reference to FIG. 4), a mass flow of the recirculated exhaust gas $dm_{AGR}/dt$ (also referred to simply as the exhaust gas recirculation mass flow), and additional input variables $u_{17.3i}$ that are relevant for the temperature of the recirculated exhaust gas. The input variables $u_{17i}$ of the function block 17 in FIG. 2 include the exhaust gas recirculation mass flow $dm_{AGR}/dt$ and the input variables $u_{17.3i}$. The exhaust gas recirculation model 17 is an overall model for the cooling of the recirculated gas by the cooler 9 of the recirculation system 8 (see FIG. 1) and includes an exhaust gas recirculation cooler model.

In a basic model 17.1, a basic cooling $y_{17.1}$ (corresponding to a reference state $u_{17.3i0}$) is calculated from the exhaust gas temperature $T_{exhaust}$ and the exhaust gas recirculation mass flow $dm_{AGR}/dt$. In a correction model 17.3, a correction variable $y_{17.3i}$ for the cooling $y_{17.1}$ is determined from the exhaust gas recirculation mass flow $dm_{AGR}/dt$ and the input variables $u_{17.3i}$. A deviation in the input variables $u_{17.3i}$ from the reference variables and/or initial input variables $u_{17.3i0}$ is taken into account here by means of the correction model 17.3. This deviation is preferably defined as the difference between the input variables $u_{17.3i}$ and the reference input variables $u_{17.3i0}$. (Alternatively, it may also be defined as the quotient of the input variables $u_{17.3i}$ and the reference input variables $u_{17.3i0}$.) The reference input variables $u_{17.3i0}$ are determined in advance, and preferably entered into a field 17.4 which is in turn saved in a memory area of a control unit.

The input variables $u_{17.3i}$ preferably include a cooling water temperature of the internal combustion engine and/or an ambient temperature. The correction model 17.3 has a separate model for each input variable $u_{17.3i}$, and thus comprises a group of correction models. Likewise, one output variable $y_{17.3i}$ of the correction model 17.3 is assigned to each input variable $u_{17.3i}$. The correction value or values $y_{17.3i}$ are added to the basic cooling $y_{17.1}$ at a combining point 17.2, forming a corrected cooling $y_{17.2}$. (Instead of an addition, a multiplication may also be performed at the combining point if this appears advantageous.) The corrected cooling $y_{17.2}$ is subtracted from the current exhaust gas temperature at the combining point 17.6, forming an exhaust gas temperature $y_{17.6}$ that takes into account cooling in the recirculation. The temperature variable $y_{17.6}$ is sent to the filter block 17.5 for dynamic correction, to obtain a realistic characteristic in forming the exhaust gas recirculation temperature $T_{AGR}$. Due to the selected model structure of the exhaust gas recirculation model 17 and the input variables $u_{17i}$ that are used and are relevant for the exhaust gas recirculation temperature, it is possible to reflect the phenomenology of a cooler provided in an exhaust gas recirculation line.

Figure 6:
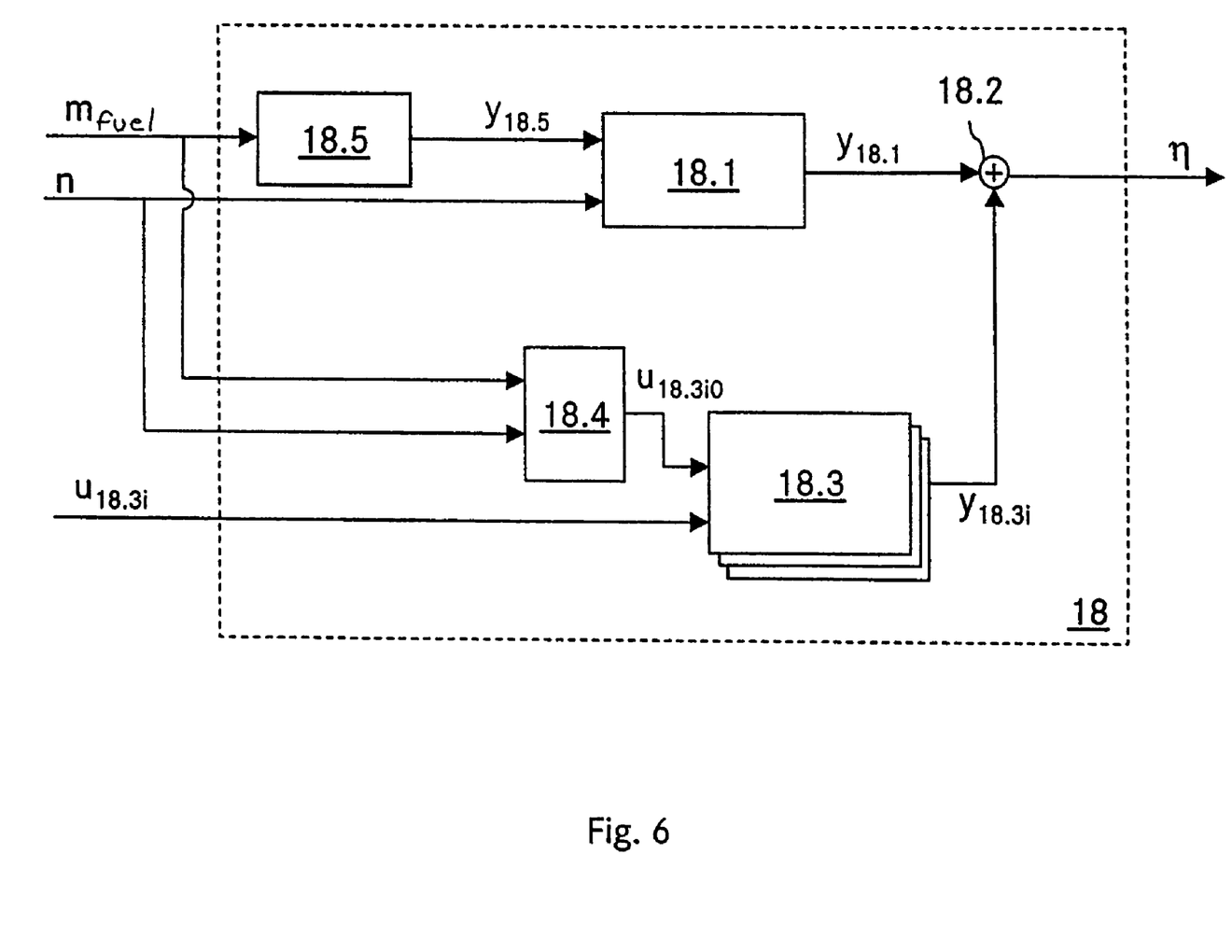
FIG. 6 shows a block diagram of an overall model for determining volumetric efficiency.

FIG. 6 shows a block diagram of an overall volumetric efficiency model 18 for determining a volumetric efficiency η based on a fuel quantity $m_{fuel}$, rotational speed of the internal combustion engine n and the input variables $u_{18.3i}$. The input variables $u_{18.i}$ of the function block 18 of FIG. 2 include fuel quantity $m_{fuel}$, rotational speed n and input variables $u_{18.3i}$.

The fuel quantity $m_{fuel}$ is filtered in a filter block 18.5, forming a filtered fuel quantity $y_{18.5}$. The latter and the rotational speed n constitute the input variables for a basic model 18.1 which is used for determining a basic volumetric efficiency $y_{18.1}$. The basic model 18.1 is preferably a volumetric efficiency engine characteristic map which spans the rotational speed n and the fuel quantity $m_{fuel}$, with the dependence on the rotational speed n being a flow effect and the dependence on the fuel quantity being a thermal effect. To better simulate this thermal effect, the fuel quantity $m_{fuel}$ is filtered in the filter block 18.5, preferably before being entered into the basic model 18.1. The filtering is preferably performed by a first-order delay element. The basic volumetric efficiency $y_{18.1}$ is corrected by a correction value $y_{18.3i}$ at a combining point 18.2. In forming the correction value or values $y_{18.3i}$ the deviation in the input variables $u_{18.3i}$ from the predefined reference states and/or initial states and/or reference input variables $u_{18.3i0}$ is taken into account. This deviation is preferably defined as the difference between the input variables $u_{18.3i}$ and the initial variables $u_{18.3i0}$. The reference input variables $u_{18.3i0}$ are preferably determined in a reference variable model 18.4 which has the rotational speed n and the fuel quantity $m_{fuel}$ as input variables. The reference variable model 18.4 is preferably an engine characteristic map which covers the fuel quantity $m_{fuel}$ and the rotational speed n.

The input variables $u_{18.3i}$ preferably include the cooling water temperature of the internal combustion engine and a mixed temperature which has been determined in the function block 14 of FIG. 2 in a previous computation step (preferably the latest computation step) of the inventive method. The mixed temperature is the temperature of the gas mixture after admixture of recirculated exhaust gas, but before entering the intake path 4 into the internal combustion engine. (See FIG. 1.) The mixed temperature as well as the cooling water temperature constitute a thermal influence of the volumetric efficiency because the volumetric efficiency represents the ratio of the real quantity of fresh gas in a cylinder of the internal combustion engine to the quantity of fresh gas theoretically possible based on a reference location, preferably the mixing site of fresh gas, i.e., fresh air and recycled exhaust gas. The real quantity of gas mixture is influenced by the flow losses between the mixing site and the cylinder, by heating and/or cooling of the gas mixture due to surrounding components. The heating and/or cooling of the gas mixture due to the surrounding components leads to a loss of density or to an increase in density of the gas mixture.

The correction model 18.3 includes one model (or one engine characteristic map) per input variable $u_{18.3i}$. Likewise, each input variable $u_{18.3i}$ is assigned an output variable and/or a correction value $y_{18.3i}$. The correction value(s) $y_{18.3i}$ is (are) added to the basic volumetric efficiency $y_{18.1}$ at a combining point 18.2, forming the current volumetric efficiency η. The combining point 18.2 may also be a multiplication point if this appears advantageous.

In the volumetric efficiency model 18, the current volumetric efficiency η is calculated on the basis of a basic volumetric efficiency $y_{18.1}$. Alternatively, the current volumetric efficiency η can also be calculated on the basis of the volumetric efficiency equation mentioned above $$\eta = \frac{m_{air} \cdot T \cdot R}{p \cdot V_h}$$

from the fresh gas quantity $m_{air}$, the charging pressure p and the fresh gas temperature T as variables, where R is the individual gas constant and $V_h$ is the displacement of the internal combustion engine. The calculation methods are mathematically equivalent. The calculation starting from a basic volumetric efficiency offers the advantage that only one value, namely the volumetric efficiency, need be corrected when there is a deviation from the reference state instead of having to correct three values (pressure, temperature and fresh gas quantity).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for determining exhaust gas recirculation quantity for an internal combustion engine having exhaust gas recirculation wherein:
    the exhaust gas recirculation quantity is determined based on at least one of an exhaust gas temperature, a fresh gas temperature, a fresh gas quantity, and a volumetric efficiency;
    the fresh gas temperature is determined using a fresh gas temperature model that is adaptively adjusted in response to influencing parameters relevant to the fresh gas temperature;
    at least one model for determining the variables fresh gas temperature, exhaust gas temperature, or volumetric efficiency comprises a basic model which is used to determine a basic value, and a correction model, which generates an output value that is used to correct the basic value when the values of variables relevant to the variable to be determined deviate from reference values of these variables.

2. The method as claimed in claim 1, wherein the fresh gas temperature model comprises:
    a basic model which is used to determine a basic value for a basic temperature change; and
    a correction model which generates an output value that is used to correct the basic value when the values of variables relevant to the fresh gas temperature deviate from reference value of these variables.

3. The method as claimed in claim 2, wherein at least a portion of a value determined for the fresh gas temperature is filtered.

4. The method as claimed in claim 1, wherein the exhaust gas temperature is determined by an adaptive exhaust gas temperature model comprising a basic model which is used to determine a basic value for the exhaust gas temperature, and a correction model generates an output value that which is used to correct the basic value when the values of variables relevant to the exhaust gas temperature deviate from reference values of these variables.

5. The method as claimed in claim 4, wherein at least a portion of a value determined for the exhaust gas temperature is filtered.

6. The method as claimed in claim 1, wherein a temperature of the recirculated exhaust gas is determined from the exhaust gas temperature using an adaptive exhaust gas recirculation model comprising a basic model which is used to determine a basic cooling value, and a correction model which generates an output value that is used to correct the basic value when the values of variables relevant to the temperature of the recirculated exhaust gas deviate from reference values of these variables.

7. The method as claimed in claim 6, wherein at least a portion of a temperature of the recirculated exhaust gas is filtered.

8. The method as claimed in claim 1, wherein volumetric efficiency is determined using an adaptive volumetric efficiency model comprising a basic model which is used to determine a basic value for the volumetric efficiency, and a correction model which generates an output value that is used to correct the basic value when the values of variables relevant to the volumetric efficiency deviate from reference values of these variables.

9. The method as claimed in claim 8, wherein a value that is determined for a fuel quantity is filtered in the determination of the volumetric efficiency.

* * * * *